(12) United States Patent
Uno et al.

(10) Patent No.: US 8,523,498 B2
(45) Date of Patent: Sep. 3, 2013

(54) CUTTING INSERT AND FACE MILLING CUTTER

(75) Inventors: Kazuyuki Uno, Iwaki (JP); Naoto Nishiya, Iwaki (JP)

(73) Assignee: Tungaloy Corporation, Iwaki-shi, Fukushima (JP)

(*) Notice: Subject to any disclaimer, the term of this patent is extended or adjusted under 35 U.S.C. 154(b) by 27 days.

(21) Appl. No.: 13/327,490

(22) Filed: Dec. 15, 2011

(65) Prior Publication Data

US 2012/0087749 A1 Apr. 12, 2012

Related U.S. Application Data

(63) Continuation of application No. PCT/JP2010/060225, filed on Jun. 16, 2010.

(30) Foreign Application Priority Data

Jun. 16, 2009 (JP) ................................. 2009-142825

(51) Int. Cl.
B23C 5/20 (2006.01)

(52) U.S. Cl.
CPC ........................................ *B23C 5/20* (2013.01)
USPC ................................ 407/42; 407/61; 407/113

(58) Field of Classification Search
USPC ........................................ 407/42, 61, 62, 113
IPC ................................................. B23C 5/16, 5/20
See application file for complete search history.

(56) References Cited

U.S. PATENT DOCUMENTS

| 4,681,488 A * | 7/1987 | Markusson ................... 407/114 |
| 5,190,418 A * | 3/1993 | Nakayama et al. ............. 407/42 |
| 5,634,745 A * | 6/1997 | Wiman et al. ................. 407/113 |
| 6,050,752 A | 4/2000 | DeRoche |
| 6,543,970 B1 | 4/2003 | Qvarth et al. |
| 6,715,967 B2 * | 4/2004 | Wiman et al. ................. 407/114 |
| 7,008,148 B2 * | 3/2006 | Wiman et al. ................. 407/113 |
| 2005/0249559 A1 | 11/2005 | Lof et al. |
| 2007/0297865 A1 | 12/2007 | Hessman |

FOREIGN PATENT DOCUMENTS

| JP | 10-138033 | 5/1998 |
| JP | 11-347826 | 12/1999 |
| JP | 2004-90198 | 3/2004 |
| JP | 2006-263841 | 10/2006 |
| JP | 2007-021622 | 2/2007 |
| RU | 2000174 C1 | 9/1993 |
| SU | 632502 A1 | 11/1978 |
| SU | 1688999 A1 | 11/1991 |

OTHER PUBLICATIONS

International Search Report in PCT/JP2010/060225, dated Aug. 3, 2010.
International Preliminary Report on Patentability dated Dec. 22, 2011 issued in counterpart PCT application No. PCT/JP2010/060225.
Decision on Grant dated Mar. 27, 2013 issued in Russian counterpart application (No. 2011151403).

* cited by examiner

*Primary Examiner* — Daniel Howell
*Assistant Examiner* — Alan Snyder
(74) *Attorney, Agent, or Firm* — Womble Carlyle

(57) ABSTRACT

A cutting insert includes a cutting edge formed at an intersection of a rake face formed on a first surface and a relief face with a positive relief angle. The relief face includes a major relief face located adjacent to a major cutting edge, a first minor relief face located adjacent to the first minor cutting edge, and an intermediate relief face located adjacent to the intermediate cutting edge and extending between the major relief face and the first minor relief face. The intermediate relief face includes a protruding curved relief face extending from the first surface. An intersection of the curved relief face and the rake face has a predetermined radius of curvature and has substantially the same shape as that of an intersection of the curved relief face and a second surface.

11 Claims, 11 Drawing Sheets

CUTTING INSERT AND FACE MILLING CUTTER

CROSS-REFERENCE TO RELATED APPLICATIONS

This application is a Continuation of PCT application No. PCT/JP2010/060225 filed Jun. 16, 2010 and published as WO 2010/147157 on Dec. 23, 2010, which claims the benefit of Japanese Patent Application No. 2009-142825, filed Jun. 16, 2009. The aforementioned patent applications are incorporated by reference herein in their entirety.

BACKGROUND OF THE INVENTION

1. Field of the Invention

The present invention relates to a cutting insert and a face milling cutter with the cutting insert installed therein.

2. Description of the Related Art

Japanese Patent Laid-Open No. 2008-006579 discloses an insert for a face milling cutter which is indexable and which includes cutting edges on the respective opposite sides thereof. The insert includes a major cutting edge located adjacent to a first relief face to allow chips to be removed and a secondary cutting edge located adjacent to a second relief face to allow surface cutting to be achieved. The major cutting edge forms an angle of 45° to an imaginary line in the direction of an extension of the secondary cutting edge. An intermediate cutting edge located adjacent to a third relief face between the first relief face and the second relief face is formed between the major cutting edge and the secondary cutting edge. The intermediate cutting edge is shorter than the major cutting edge and forms an angle smaller than 45° to the imaginary line. The intermediate cutting edge shifts to the adjacent major and secondary cutting edges via an arch-like partial cutting edge located adjacent to a protruding relief face. In the insert, an upper surface is generally at right angle to side surfaces and a lower surface is generally at right angle to the side surfaces.

Some inserts for face milling cutters include a relief face formed thereon and having a positive relief angle. In such an insert, for improved processing efficiency, it is important to improve the durability of cutting edges, and specifically to make the cutting edges unlikely to be chipped.

SUMMARY OF THE INVENTION

The present invention has been developed in view of the above-described circumstances, and an object of the present invention is to provide a cutting insert configured to restrain cutting edges from being chipped, thus enabling the life of the cutting insert to be extended. Another object of the present invention is to provide a face milling cutter with the cutting insert installed therein.

The present invention provides a cutting insert for removable installation in a tool body, the cutting insert including a first surface with a rake face formed thereon, a second surface located opposite the first surface, a peripheral side surface extending between the first surface and the second surface and including a relief face formed thereon and having a positive relief angle, and a cutting edge formed at an intersection of the rake face and the relief face, wherein the relief face is formed in association with a given corner of the cutting insert and includes a major relief face, a first minor relief face, and an intermediate relief face extending between the major relief face and the first minor relief face, wherein the cutting edge includes a major cutting edge formed at an intersection of the major relief face and the rake face, a first minor cutting edge formed at an intersection of the first minor relief face and the rake face, and an intermediate cutting edge formed at an intersection of the intermediate relief face and the rake face and linked to the major cutting edge and the first minor cutting edge, and wherein the intermediate relief face includes a protruding curved relief face extending from the first surface to the second surface, and the intersection of the curved relief face and the rake face has a predetermined radius of curvature, and has a shape substantially identical to a shape of the intersection of the curved relief face and the second surface.

Furthermore, the present invention provides a face milling cutter including the above-described cutting insert, and a tool body with the cutting insert removably installed therein and rotated around a central axis, and in the face milling cutter, the cutting insert may be installed in the tool body in such a manner that the first minor cutting edge extends so as to be substantially perpendicular to the central axis and that the cutting insert has a positive axial rake angle and a negative radial rake angle.

Further features of the present invention will become apparent from the following description of exemplary embodiments (with reference to the attached drawings).

DETAILED DESCRIPTION

Figure 1:
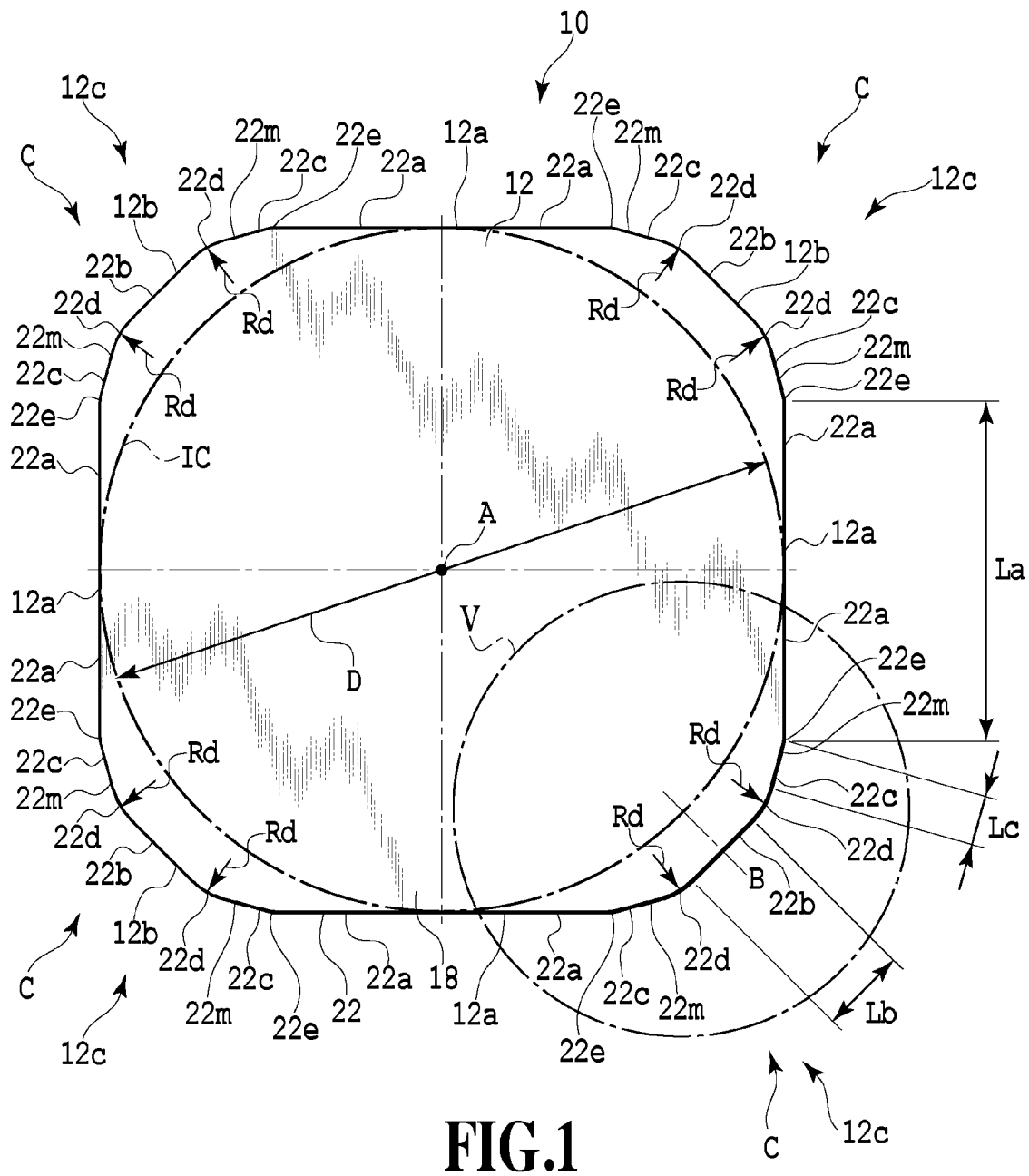
FIG. 1 is a front view of a cutting insert according to an embodiment of the present invention.

An embodiment of the present invention will be described below, referring to Figures.

A cutting insert (hereinafter referred to as an insert) 10 according to the present embodiment is schematically shown in and will be described with reference to FIG. 1 to FIG. 6. The insert 10 is shaped like a substantially square plate. The insert 10 is an insert for use in a face milling cutter.

The insert 10 includes two opposite end surfaces 12 and 14 and a peripheral side surface 16 extending therebetween. The two end surfaces 12 and 14 correspond to an upper surface 12 serving as a first surface and a lower surface 14 serving as a second surface on the side opposite to the first surface, respectively. In the insert 10, an axis A is defined which extends through the upper surface 12 and the lower surface 14.

A rake face 18 is formed on the upper surface 12 of the insert 10. The upper surface 12 is substantially square and rotationally symmetric with respect to the axis A. Here, the upper surface 12 is formed to be substantially flat. The lower surface 14 is formed so as to function as a seating surface to be placed on an insert attachment seat of a tool body described below. Here, the lower surface 14 is formed to be substantially flat. The upper surface 12, corresponding to the first surface, is larger than the lower surface 14, corresponding to the second surface. The peripheral side surface 16 is generally inclined so as to recede gradually from an intersection of the peripheral side surface 16 and the upper surface 12 toward an intersection of the peripheral side surface 16 and the lower surface 14. A relief face 20 is formed on the peripheral side surface 16 described above. The relief face 20 is formed so as to have a positive relief angle. The relief face 20 extends so as to form an acute angle to the rake face 18. In the insert 10, the relief face 20 extends all over the peripheral side surface 16.

In the insert 10, a cutting edge 22 is formed at an intersection of the rake face 18 on the upper surface 12 and the relief face 20 on the peripheral side surface 16.

Here, the cutting edge 22 extends continuously all over the intersection of the rake face 18 on the upper surface 12 and the relief face 20 on the peripheral side surface 16. That is, the cutting edge 22 extends annularly. However, although the rake face 18 on the upper surface 12 is substantially flat as described above, a chip breaker groove formed of a recessed groove or the like may be formed along a part or all of the cutting edge 22 and adjacent to the cutting edge 22.

On the upper surface 12 of the insert 10, the largest circle IC (hereinafter referred to as the inscribed circle) inscribed inside edge portions of the upper surface 12 can be defined (see FIG. 1). The insert 10 is designed such that the diameter D of the inscribed circle IC (hereinafter referred to as the inscribed circle diameter) has a predetermined length. For example, the inscribed circle length D is 12.7 mm. The insert 10 according to the present embodiment is formed of cemented carbide. However, the insert 10 according to the present invention can be formed of various materials. At least the cutting edge portion of the insert may be formed of a hard material such as cemented carbide, coating cemented carbide, cermet, ceramic, a diamond sintered compact, or cubic boron nitride. The shape of the upper surface, that is, the first surface, of the insert according to the present invention may be, instead of the substantial square, any of various substantial polygons such as a rectangle, a parallelogram, a rhomboid, a triangle, a pentagon, and a hexagon. Furthermore, the size of the upper surface may be arbitrarily changed.

The relief face 20 formed on the peripheral side surface 16 of the insert includes a major relief face 20a, a first minor relief face 20b, a chamfered corner relief face 20c, and a corner R relief face 20d. Each of the chamfered corner relief faces 20c and a corresponding one of the corner R relief faces 20d extend between a corresponding one of the major relief faces 20a and a corresponding one of the first minor relief faces 20b. Here, these faces are collectively referred to as an intermediate relief face 20m. The major relief face 20a, the first minor relief face 20b, the chamfered corner relief face 20c, and the corner R relief face 20d each extend from an intersection of the relief face and the upper surface 12 to an intersection of the relief face and the lower surface 14. In the figures, boundary lines 24a and 24b indicating the boundaries of the corner R relief faces 20d are shown. However, in an actual insert, the boundary lines are substantially prevented from appearing or prevented from appearing completely. The boundary lines 24a and 24b are only shown to make the reader easily understand the embodiment. This also applies to the other boundary lines on the peripheral side surface 16.

The major relief face 20a, the first minor relief face 20b, the chamfered corner relief face 20c, and the corner R relief face 20d are formed in association with a given corner portion 12c of the upper surface 12, that is, with a corner C of the insert 10 corresponding to the given corner portion 12c of the upper surface 12. The upper surface 12 is substantially square, and thus the insert 10 includes four corners C. Hence, the insert 10 includes four major relief faces 20a. The insert 10 will be described below basically with focus placed on any given corner C.

Figure 2:
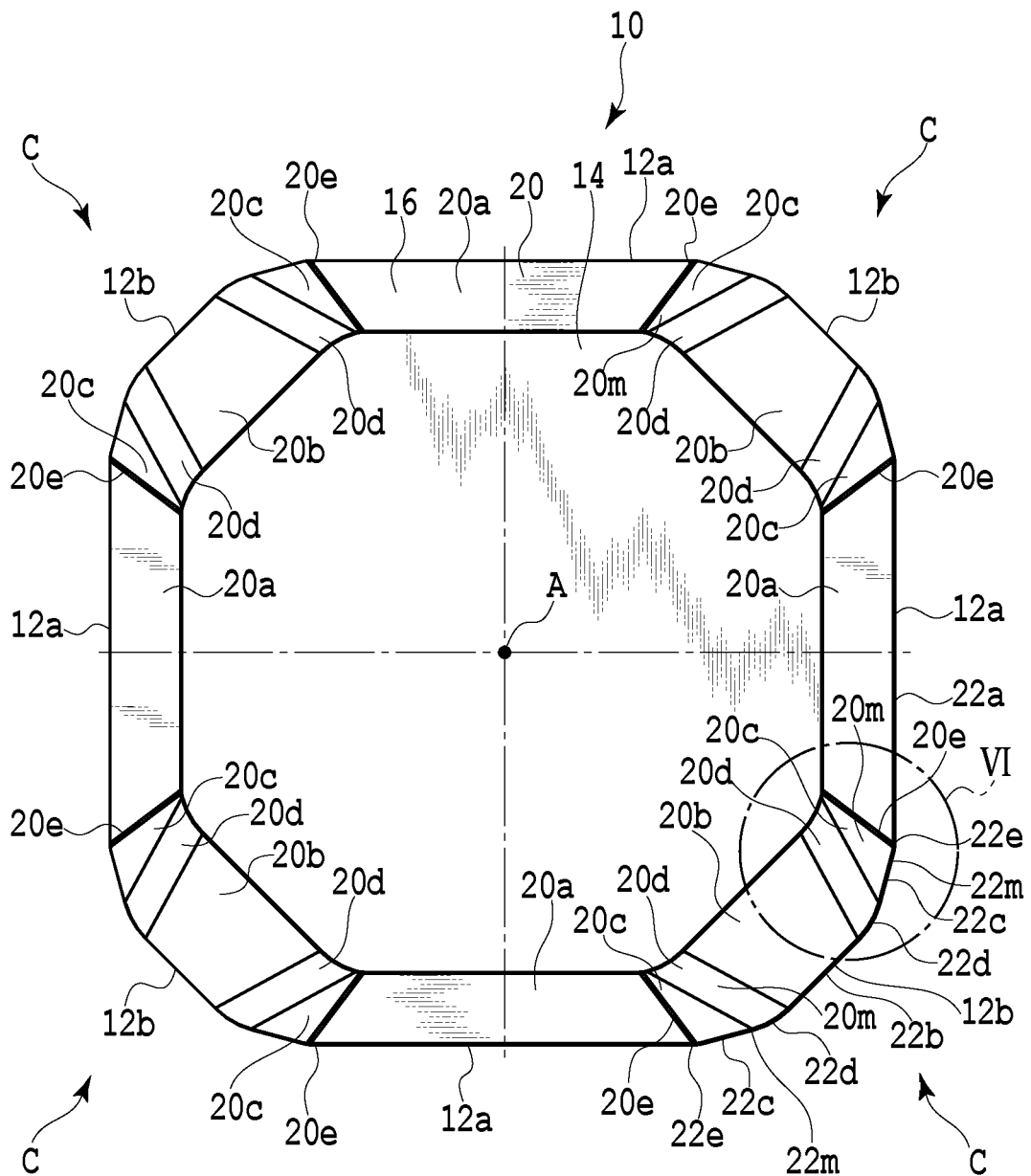
FIG. 2 is a rear view of the cutting insert shown in FIG. 1.
Figure 3:
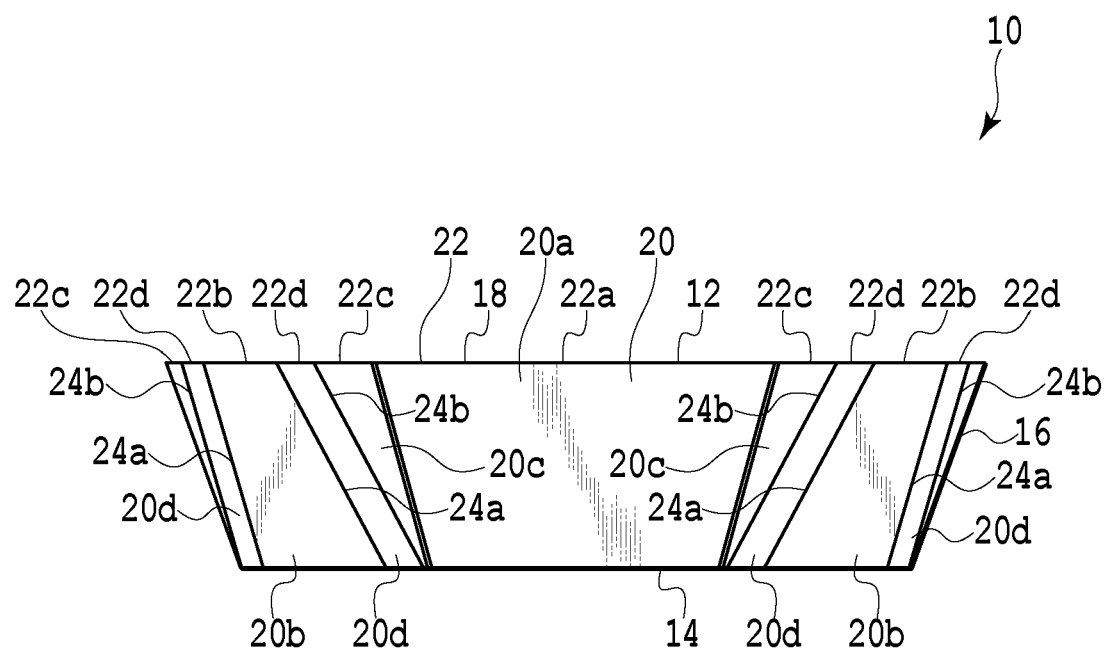
FIG. 3 is a side view of the cutting insert shown in FIG. 1.
Figure 4:
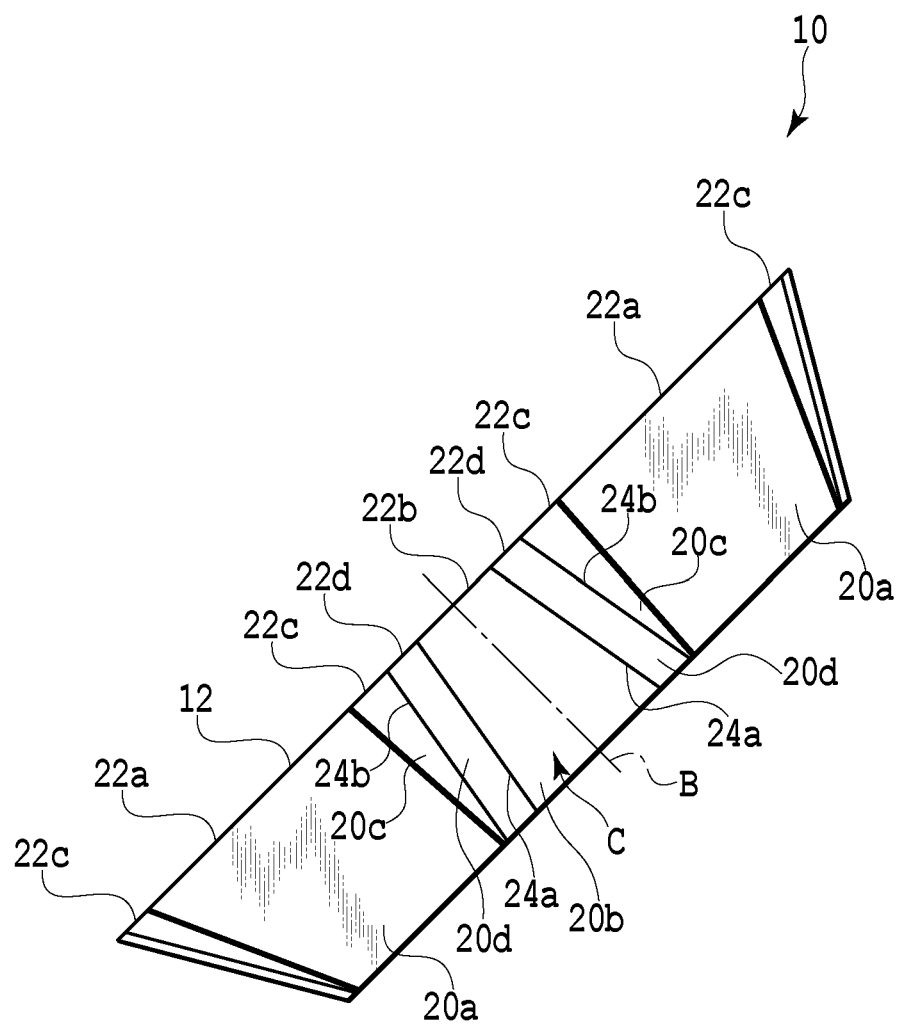
FIG. 4 is a side view of the cutting insert shown in FIG. 1 as seen from one corner portion thereof.

As is easily understood from FIG. 2 to FIG. 4, the major relief face 20a is formed so as to extend along a long side portion 12a of the upper surface 12. The first minor relief face 20b is formed so as to extend from a chamfered edge 12b formed at the corner portion 12c of the upper surface 12. The chamfered edge 12b is, for example, 45° in angle of chamfer. The chamfered corner relief face 20c is formed close to the major relief face 20a. The corner R relief face 20d is formed so as to extend between the first minor relief face 20b and the chamfered corner relief face 20c. In the present embodiment, the major relief face 20a, the first minor relief face 20b, and the chamfered corner relief face 20c are each substantially flat. The corner R relief face 20d protrudes outward and is curved. The corner R relief face 20d may be referred to as a curved relief face. However, in the insert 10, a curved relief face with a small width or a connection relief face 20e is formed between the major relief face 20a and the chamfered corner relief face 20c, which is smoothly linked to the relief faces 20a and 20c. The connection relief face 20e is included in the intermediate relief face. The connection relief face 20e extends from the upper surface 12 to the lower surface 14.

However, as described below, when the insert 10 is positioned on the tool body of the face milling cutter, the major relief face 20a not located adjacent to a operable cutting edge can function as a restrained surface coming into selective abutting contact with the tool body. The operable cutting edge as used herein refers to a portion of the cutting edge 22 in the face milling cutter with the insert 10 installed therein which cuts into a work material to be cut, that is, a cutting edge which can be involved in cutting. Furthermore, each of the first minor relief face 20b and the chamfered corner relief face 20c may be a curved surface. The connection relief face 20e may be flat. Furthermore, the connection relief face 20e may be omitted. In this case, the chamfered corner relief face 20c is formed so as to lead directly to the major relief face 20a.

The relief angle of each relief face is follows. The relief angle of the major relief face 20a may be set within a range from 7° or more to 25° or less, the relief angle of the first minor relief face 20b may be set within a range from 10° or more to 35° or less, and the relief angle of the chamfered corner relief face 20c may be set within a range from 10° or more to 35° or less. Moreover, the relief angle of the first minor relief face 20b may be preferably set so as to be equal to or more than that of the major relief face 20a. For example, the relief angle of the major relief face 20a is set to 20°, the relief angle of the first minor relief face 20b is set to 30°, and the relief angle of the chamfered corner relief face 20c is set to 23°.

The cutting edge 22 of the insert 10 includes a major cutting edge 22a, a first minor cutting edge 22b, a chamfered corner 22c, a corner R edge 22d, and a connection edge 22e. The chamfered corner 22c, the corner R edge 22d, and the connection edge 22e extend between the major cutting edge 22a and the first minor cutting edge 22b; here, they may be collectively referred to as an intermediate cutting edge 22m.

The major cutting edge 22a is formed at an intersection of the rake face 18 and the major relief face 20a. The first minor cutting edge 22b is formed at an intersection of the rake face 18 and the first minor relief face 20b. The chamfered corner 22c is formed at an intersection of the rake face 18 and the chamfered corner relief face 20c. The corner R edge 22d is formed at an intersection of the rake face 18 and the corner R relief face 20d. The corner R edge 22d is shaped like a curved line or a circular arc corresponding to the shape of the curved corner R relief face 20d, and therefore, may be referred to as an arcuate cutting edge. The corner R edge 22d has a predetermined radius of curvature as described below. The corner R edge 22d is designed to lead smoothly, in a tangential direction, to each of the first minor cutting edge 22b and chamfered corner 22c, which are located adjacent to the corner R edge 22d. That is, the intersection of the rake face 18 and the corner R relief face 20d is smoothly linked, in the tangential direction, to each of the intersection of the rake face 18 and the first minor relief face 20b and the intersection of the rake face 18 and the chamfered corner relief face 20c. The connection edge 22e is formed at an intersection of the rake face 18 and the connection relief face 20e.

Like the relief face 20, the above-described cutting edge 22, that is, the major cutting edge 22a, the first minor cutting edge 22b, the chamfered corner 22c, the corner R edge 22d, and the connection edge 22e, are formed in association with the given corner portion 12c of the upper surface 12, that is, with the corner C of the insert 10 corresponding to the given corner portion 12c of the upper surface 12. In the cutting edge 22, the major cutting edge 22a, the first minor cutting edge 22b, the chamfered corner 22c, the corner R edge 22d, and the connection edge 22e are formed to be indexable (referring to FIG. 1 and FIG. 2).

The length Lb of the first minor cutting edge 22b may be preferably set within about 0.5 mm to 3 mm, for example, to 1.6 mm. When the insert 10 is seen from a direction opposite to the upper surface 12, that is, in FIG. 1, the angle formed between the first minor cutting edge 22b and the chamfered corner 22c may be set within a range from 145° or more to 170° or less. That is, the intermediate cutting edge and the intermediate relief face may be designed such that an extension line along an intersection of the first minor relief face 20b and the rake face 18, that is, the first minor cutting edge 22b forms an angle within a range from 145° or more to 170° or less to an extension line along an intersection of the chamfered corner relief face 20c and the rake face 18, that is, the chamfered corner 22c. For example, the angle between the first minor cutting edge 22b and the chamfered corner 22c is set to 150°. Furthermore, the radius of curvature Rd of an intersection of the corner R relief face 20d and the rake face 18, that is, the radius of curvature Rd of the corner R edge 22d, may be set within a range from 0.4 mm or more to 2.5 mm or less. Additionally, the length Lc of the chamfered corner 22c may be set within a range from 0.4 mm or more to 14% or less of the inscribed circle diameter D of the upper surface 12 of the insert 10. For example, if the inscribed circle diameter D is 12.7 mm, the length Lc of the chamfered corner 22c may be set within a range from 0.4 mm or more to 1.77 mm or less. In addition, for example, if the inscribed circle diameter D is 15.875 mm, the length Lc of the chamfered corner 22c may be set within a range from 0.4 mm or more to 2.22 mm or less.

If the relief surfaces 20b and 20c, associated with the first minor cutting edge 22b and the chamfered corner 22c, respectively, are shaped like curved surfaces, the first minor cutting edge 22b and the chamfered corner 22c are shaped like curved lines corresponding to the relief surfaces 20b and 20c, respectively. In this case, the radius of curvature of the first minor cutting edge 22b is desirably set within a range, for example, from 50 mm to 600 mm, in view of finished surface roughness. Furthermore, if the connection relief face 20e is not formed, the connection edge 22e is not present. In this case, the chamfered corner 22c is linked directly to both the major cutting edge 22a and the corner R edge 22d.

The curved relief face or corner R relief face 20d, included in the intermediate relief face, extends from the upper surface 12 to the lower surface 14 as described above. The corner R relief face 20d extends between the upper surface 12 and the lower surface 14 with the width of the corner R relief face 20d substantially prevented from varying. That is, as shown in FIG. 4, when the insert 10 is seen from a bisecting plane B of the corner C, a boundary line 24a between the corner R relief face 20d and the first minor relief face 20b and a boundary line 24b between the corner R relief face 20d and the chamfered corner relief face 20c extend from the upper surface 12 to the lower surface 14 and are in a substantially parallel relationship. Incidentally, the bisecting plane B is defined as a plane formed to bisect the first minor cutting edge 22b and to bisect the first minor relief face 20b. Here, the bisecting plane B includes the axis A.

In a direction from the upper surface 12 toward the lower surface 14, each of the two boundary lines 24a and 24b and the corner R relief face 20d incline so as to gradually leave the bisecting plane B (referring to FIG. 4). However, the corner R relief face 20d may be designed to extend so as to gradually approach the bisecting plane B in the direction from the upper surface 12 toward the lower surface 14. In the insert according to the present invention, as described above, the corner relief face, which is a curved relief face, extends so that the distance between the corner relief face and the bisecting plane B varies gradually in the direction from the upper surface toward the lower surface.

Furthermore, the intersection of the corner R relief face 20d and the rake face 18, that is, the corner R edge 22d, has the predetermined radius of curvature as described above. Additionally, the intersection of the corner R relief face 20d and the rake face 18 has substantially the same shape as that of the intersection of the corner R relief face 20d and the lower surface 14. Moreover, each portion of the corner R relief face 20d corresponding to one of a plurality of virtual planes defined to be perpendicular to the axis A while crossing the peripheral side surface 16 has substantially the same shape as that of the intersection of the corner R relief face 20d and the rake face 18, that is, the corner R edge 22d. Thus, various portions of the corner R relief face 20d which are parallel to the intersection of the corner R relief face 20d and the rake face 18 have substantially the same shape as that of the intersection of the corner R relief face 20d and the rake face 18. As described above, the intersection of the rake face 18 and the corner R relief face 20d is designed so as to lead smoothly, in the tangential direction, to the intersection of the rake face 18 and the first minor relief face 20b and to the intersection of the rake face 18 and the chamfered corner relief face 20c. The intersection of the corner R relief face 20d and the lower surface 14 is also designed so as to lead smoothly, in the tangential direction, to the intersection of the first minor relief face 20b and the lower surface 14 and to the intersection of the chamfered corner relief face 20c and the lower surface 14.

Figure 5:
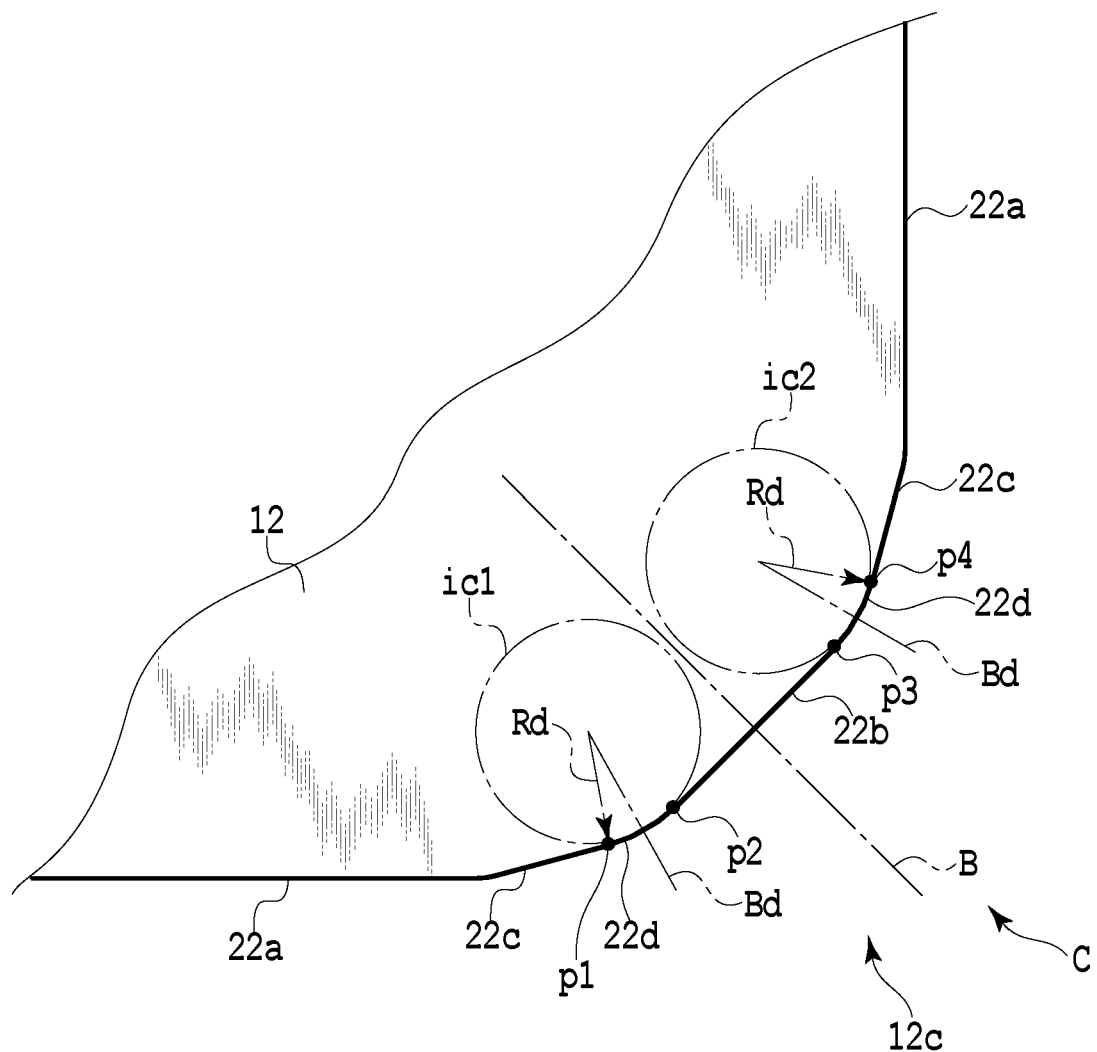
FIG. 5 is an enlarged view of an area enclosed by a circle V in FIG. 1, the view illustrating the shape of a corner of the cutting insert in FIG. 1.
Figure 6:
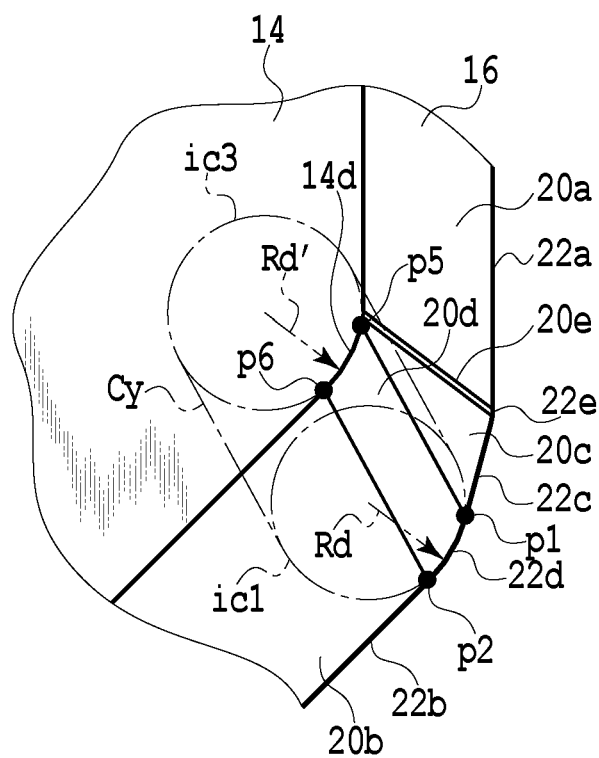
FIG. 6 is an enlarged view of an area enclosed by a circle VI in FIG. 2, the view illustrating the shape of the corner of the cutting insert in FIG. 1.

The above-described curved relief face, that is, the corner R relief face 20d, will be further described with reference to FIG. 5 and FIG. 6. FIG. 5 is an enlarged view of an area enclosed by a circle V in FIG. 1. FIG. 6 is an enlarged view of an area enclosed by a circle VI in FIG. 2.

FIG. 5 shows two corner R edges 22d. One of them is defined between points p1 and p2 and the other of them is defined between points p3 and p4. The radius of curvature Rd of the corner R edge 22d corresponds to the radius of each of virtual circles ic1 and ic2. The radii of curvature of the plurality of corner R edges 22d are all substantially the same. However, the virtual circles ic1 and ic2 may be defined on a plane orthogonal to the axis A. Here, the virtual circles ic1 and ic2 are defined to substantially extend on the upper surface 12.

Furthermore, FIG. 6 shows one of the corner R relief faces 20d in an enlarged form and also shows the intersection of the corner R relief face 20d and the rake face 18, that is, the corner R edge 22d, and the intersection (lower intersection) 14d of the corner R relief face 20d and the lower surface 14. In FIG. 6, as already described with reference to FIG. 5, the corner R edge 22d is defined between the points p1 and p2. The lower intersection 14d is defined between points p5 and p6. The radius of curvature Rd of the corner R edge 22d corresponds to the radius of the virtual circle ic1, and the radius of curvature Rd' of the lower intersection 14d corresponds to the radius of a virtual circle ic3. The circles ic1 and ic3 have substantially the same radius. The radius of curvature Rd of the corner R edge 22d is substantially the same as the radius of curvature Rd' of the lower intersection 14d. However, the virtual circle ic3 may be defined on a plane orthogonal to the axis A. Here, the virtual circle ic3 is defined to substantially extend on the lower surface 14.

As is easily understood from FIG. 6, the corner R relief face 20d can be defined as a surface on a virtual circular cylinder (or a virtual elliptic cylinder) Cy with an end circle corresponding to the circle ic1, an end circle corresponding to the circle ic3, and an inclined axis. The corner R relief face 20d extends with the width thereof substantially prevented from varying between the upper surface 12 and the lower surface 14. Thus, a portion of the corner R relief face 20d which is parallel to the intersection of the corner R relief face 20d and the rake face 18 has substantially the same shape as that of the intersection of the corner R relief face 20d and the rake face 18, that is, the corner R edge 22d.

Furthermore, the relief angle of the corner R edge 22d is not constant at the cross sections thereof along the normal direction. An assumption is made that there are a plurality of cross sections, along the normal direction, of the corner R edge (arcuate cutting edge) 22d formed at the intersection of the corner R relief face 20d and the rake face 18. Then, the relief angle of the corner R relief face 20d is largest at a bisecting cross section Bd (see FIG. 5), one of the cross sections which divides the corner R edge 22d into two equal parts. The relief angle of the corner R relief face 20d decreases gradually consistently with distance to each of the opposite ends of the corner R edge 22d in a direction from the bisecting cross section Bd.

Figure 7:
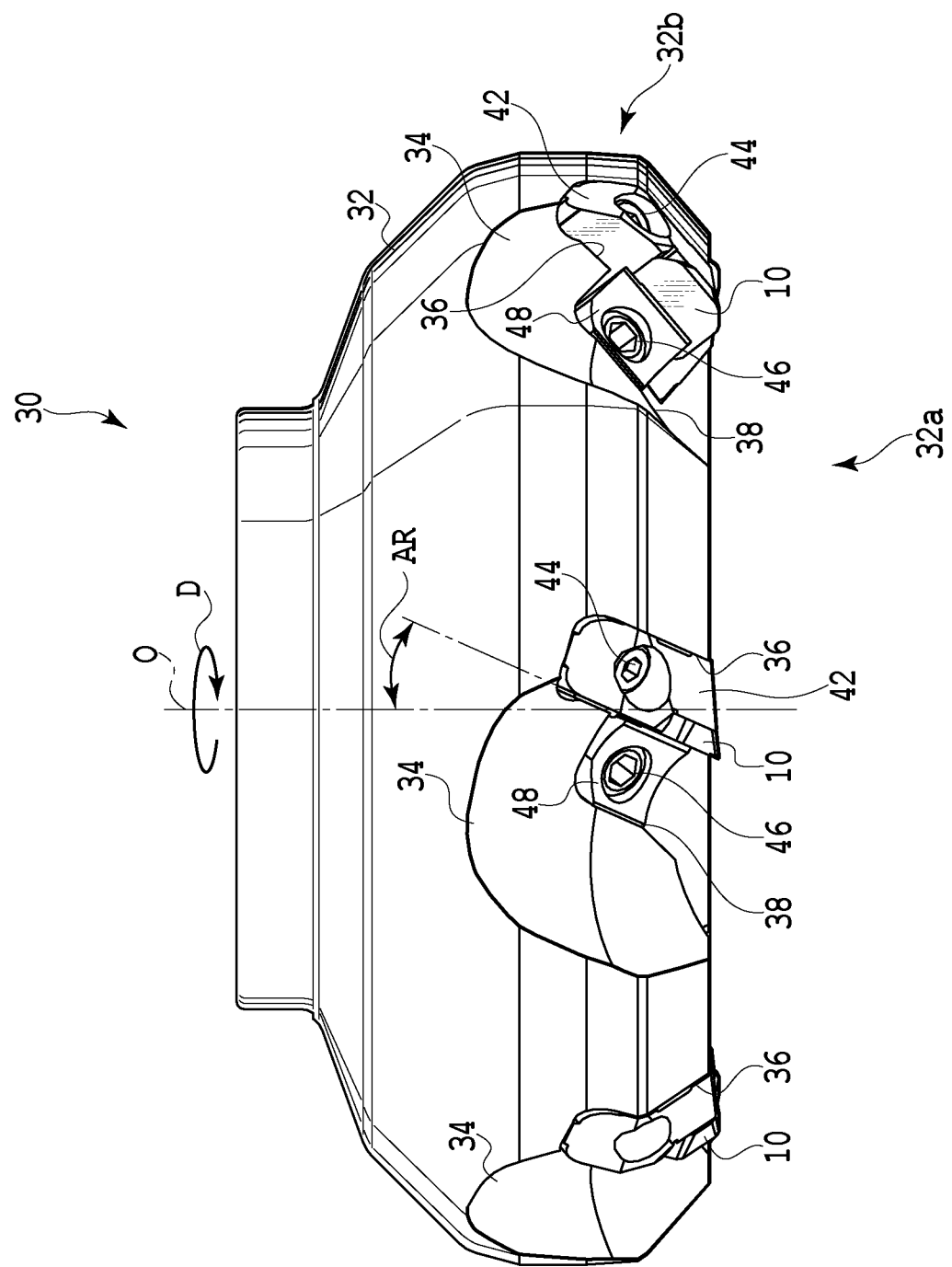
FIG. 7 is a front view of a face milling cutter in which the cutting insert shown in FIG. 1 is installed.
Figure 8:
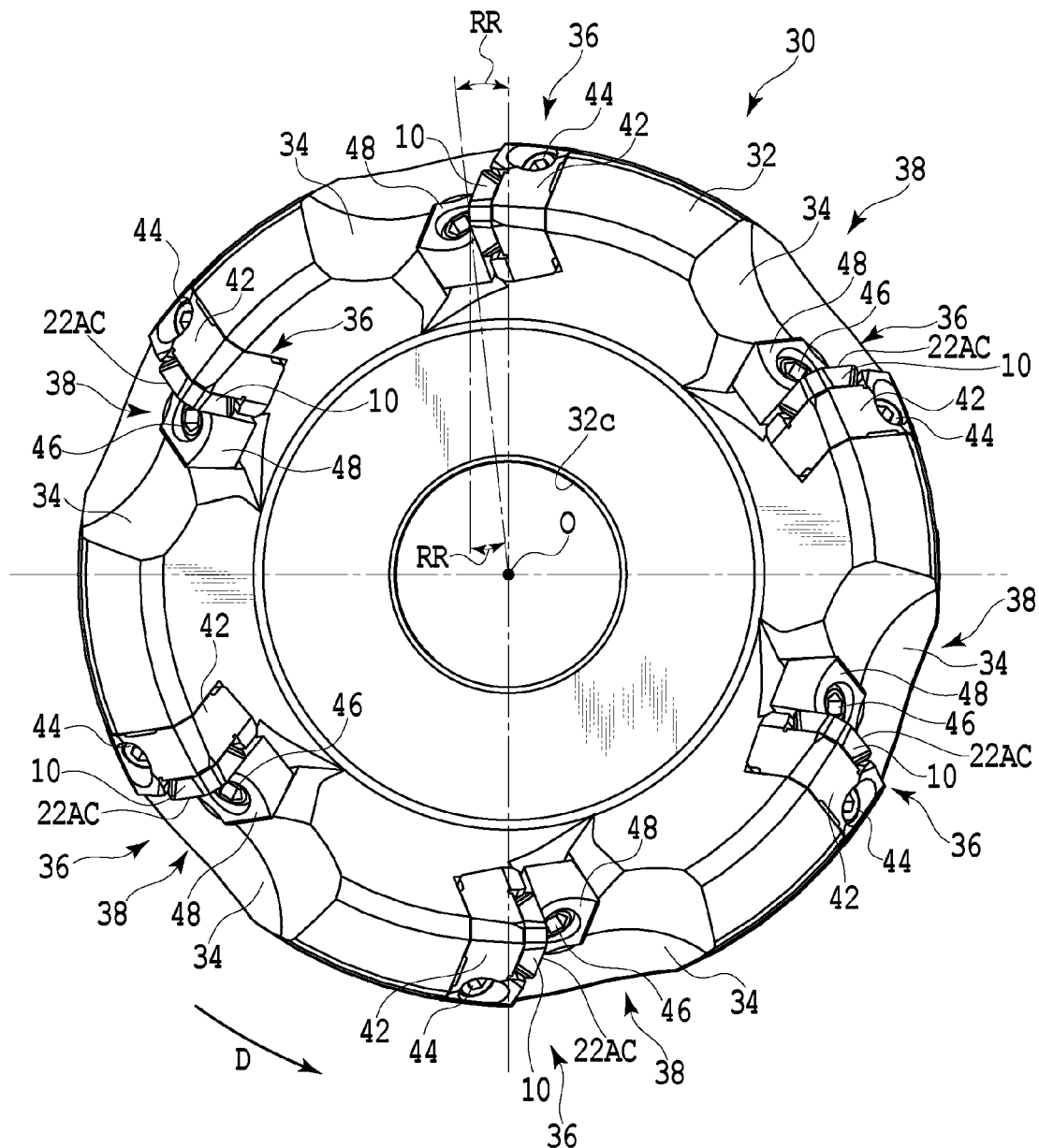
FIG. 8 is a bottom view of the face milling cutter shown in FIG. 7.
Figure 9:
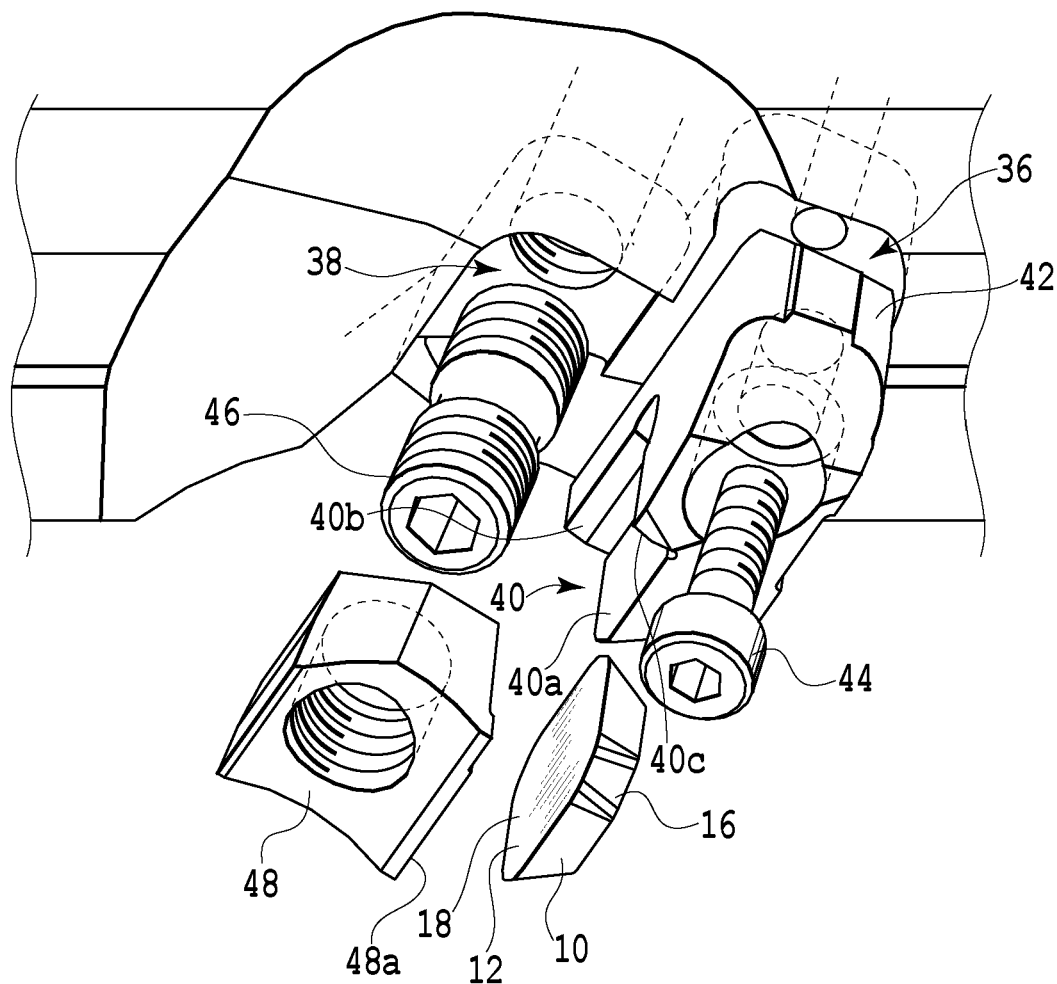
FIG. 9 is a partial exploded perspective view about any one cutting insert in the face milling cutter in FIG. 7.

The above-described cutting insert 10 is used for a face milling cutter 30 schematically shown in FIG. 7 to FIG. 9. The face milling cutter 30 includes a cutting tool body 32 rotated around a central axis O. Six inserts 10 are removably installed along an outer peripheral surface 32b of a leading end portion 32a of the tool body 32 at substantially equal intervals in a circumferential direction. However, in the present invention, the number of inserts attached to the tool body is not limited to six. The number may be one and may preferably be plural, that is, two, three, four, five, seven, or larger.

A boss provided at a trailing end of the tool body includes an end surface configured to come into abutting contact with an end surface of a spindle of a machine tool, an end surface of an arbor, or the like. Furthermore, the tool body 32 includes a through-hole 32c extending along the central axis O. On an outer peripheral surface 32b of the leading end portion 32a of the tool body 32, six chip pockets 34 are provided at equal intervals along a circumferential direction, and are concave.

An insert attachment groove 36 is formed adjacent to and at the rear of each of the chip pockets 34 in a tool rotating direction D. A wedge insertion groove 38 is formed adjacent to and in front of the insert attachment groove 36 in the tool rotating direction D. However, the number of chip pockets 34 or the like corresponds to the number of inserts and is not limited to six. The number may be, for example, plural.

A holding member (locator) 42 including an insert attachment seat 40 on which the insert 10 is seated is fixed to the insert attachment groove 36 using a screw member 44. A wedge member 48 is inserted into the wedge insertion groove 38 so as to be able to move forward and backward in the depth direction of the wedge insertion groove 38. The wedge member 48 is fixed using a screw member 46.

Figure 10:
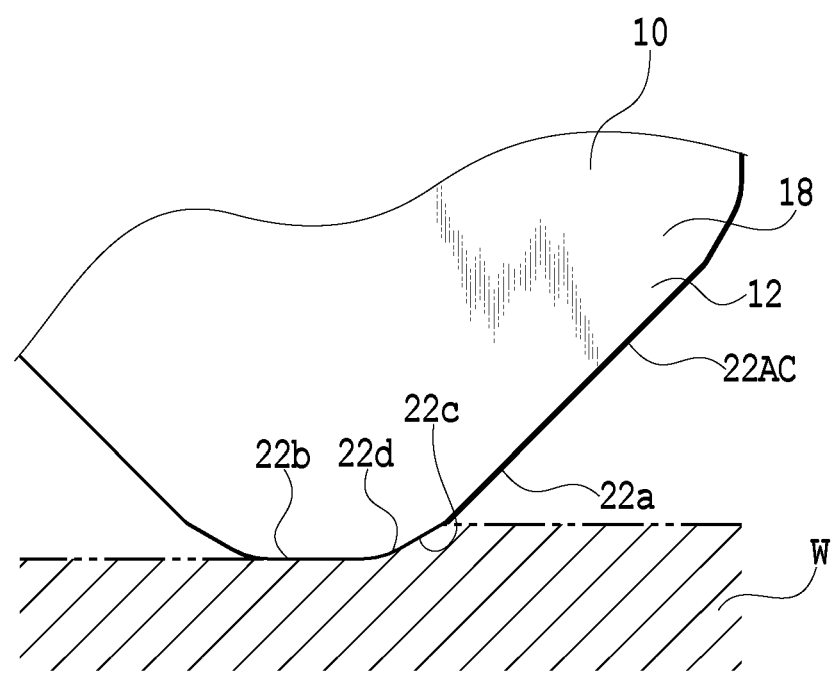
FIG. 10 is an enlarged schematic diagram illustrating the status of a given cutting insert during cutting with the face milling cutter in FIG. 7.

The lower surface 14 of the insert 10 functions as a seating surface. The lower surface 14 is seated on a bottom surface 40a of the insert attachment seat 40 of the holding member 42. The paired major relief faces 20a facing the trailing end side function as restrained surfaces; the paired major relief faces 20a belong to the peripheral side surface 16 except for a part of the relief face located adjacent to a operable cutting edge 22AC corresponding to a cutting edge that can be involved in cutting. The paired major relief faces 20a come into abutting contact with paired wall surfaces 40b and 40c, respectively, which extend upright from the bottom surface 40a. The wedge member 48 advanced or sunken in the depth direction of the wedge insertion groove 38 comes into contact with the upper surface 12 of the insert 10 at one side surface 48a thereof. The wedge member 48 then presses the insert 10 toward the seating surface to fix the insert 10. However, the insert 10 is attached so that the first minor cutting edge 22b extends substantially at right angle to the central axis O. Furthermore, as schematically shown in FIG. 10, the insert 10 is fixed to the tool body 32 so as to face a workpiece W.

The insert 10 is designed such that the flank angle of the first minor relief face 20b is equal to or larger than that of the major relief face 20a as described. Furthermore, the insert 10 is installed in the tool body 32 of the face milling cutter 30 so as to have a positive axial rake angle AR and a negative radial rake angle RR (see FIG. 7 and FIG. 8). The insert 10 is installed in the face milling cutter 30 set so as to have the positive axial rake angle AR and the negative radial rake angle RR. For example, the axial rake angle AR is set to about 24°, and the radial rake angle RR is set to about −6°. Thus, the rake face 18 of the insert 10 inclines toward the trailing end side with respect to a plane parallel to the central axis O, and faces outward from a tangential direction of the tool rotating direction D. Moreover, as shown in FIG. 8, in connection with the operable cutting edge 22AC of the insert 10 installed in the tool body 32, the boundary line 24a between the corner R relief face 20d and the first minor relief face 20b inclines so that the distance from the tangent of the tool rotating direction D at the intersection of the corner R edge 22d and the first minor cutting edge 22b increases gradually consistently with the distance to the lower surface 14 in a direction from the rake face 18 on the upper surface 12. Thus, when the given major cutting edge 22a, given first minor cutting edge 22b, given chamfered corner 22c, and given corner R edge 22d, which correspond to the operable cutting edge 22AC of the insert 10, cut into the workpiece W, the operable cutting edge gradually cuts into the workpiece W. Hence, the cutting applies reduced impact, allowing vibration or chatter of the face milling cutter to be prevented. This also prevents relief wear occurring on the corner R relief face 20d from extending to the rear side of the first minor cutting edge 22b in the tool rotating direction D. As a result, the relief wear is prevented from affecting the surface roughness of the machined surface.

In the insert 10 according to the present embodiment, the corner R relief face 20d extends from the upper surface 12 to the lower surface 14. Furthermore, the intersection of the corner R relief face 20d and the rake face 18, that is, the corner R edge 22d, has the predetermined radius of curvature. Additionally, the intersection of the corner R relief face 20d and the rake face 18 has substantially the same shape as that of the intersection of the corner R relief face 20d and the lower surface 14. Moreover, various portions of the corner R relief face 20d which are parallel to the intersection of the corner R relief face 20d and the rake face 18 have substantially the same shape as that of the intersection of the corner R relief face 20d and the rake face 18. As described above, the corner R relief face 20d is provided all over the thickness of the insert 10, and has a substantially constant width in a direction at right angle to the thickness direction. This ensures a strength sufficient to allow the entire corner R relief face 20d to resist cutting resistance acting on the corner R edge 22d. Moreover, the intersection of the corner R relief face 20d and the rake face 18 on the upper surface 12 is smoothly linked to the intersection of the first minor relief face 20b and the rake face 18 and to the intersection of the chamfered corner relief face 20c and the rake face 18. This more appropriately ensures a strength sufficient to allow the entire corner R relief face 20d to resist cutting resistance acting on the corner R edge 22d.

In connection with the cross sections of the corner R edge 22d along the normal direction, the relief angle of the corner R relief face 20d is largest at the bisecting cross section Bd, which divides the corner R edge 22d into two equal parts. The relief angle of the corner R relief face 22d decreases gradually consistently with distance to each of the opposite ends of the corner R edge 22d in a direction from the bisecting cross section. In this configuration, the cutting edge strength of the corner R edge 22d increases with decreasing distance to each of the boundary portion between the corner R edge and the first minor cutting edge 22b located adjacent to the corner R edge 22d and the boundary portion between the corner R edge 22d and the chamfered corner 22c located adjacent to the corner R edge 22d. This improves the toughness of the corner R edge 22d against chipping, thus restraining the corner R edge 22d from being chipped. Thus, the life of the insert can be extended. Moreover, the milling cutter with the insert 10 is suitable for face milling with a high feed per tooth.

As described above, the relief angle of the corner R relief face 20d increases with decreasing distance to the intersection of the corner R edge 22d and the bisecting cross section Bd in a direction from each of the opposite ends of the corner R edge 22d. Thus, the relief wear is prevented from progressing early. This also enables the life of the cutting insert to be extended.

When the angle between the first minor cutting edge 22b and the chamfered corner 22c located adjacent to each other through the corner R edge 22d is set within a range from 145° or more to 170° or less, the substantial undeformed chip thickness of the chamfered corner 22c and corner R edge 22d is reduced. This reduces loads on the cutting edges 22c and 22d, which are thus unlikely to be chipped. Thus, the chamfered corner 22c and the corner R edge 22d are excellent in chipping resistance. This enables the life of the cutting insert to be extended. Moreover, the insert 10 described above is suitable for face milling with high feed per tooth.

Setting the radius of curvature Rd of the corner R edge 22d to 0.4 mm or more allows the corner R edge 22d to offer a sufficient strength. However, an excessively large radius of curvature Rd of the corner R edge 22d increases the cutting resistance acting on the corner R edge 22d. The increased cutting resistance acting on the corner R edge 22d may disadvantageously cause vibration or chatter in face milling with increased feed per tooth. Moreover, in such a case, burrs or the like may occur on the machined surface of the workpiece. Thus, the radius of curvature Rd of the corner R edge 22d is desirably set to 2.5 mm or less.

Setting the length Lc of the chamfered corner 22c to 0.4 mm or more reliably serves to increase the feed per tooth of the chamfered corner 22c. The increased length Lc of the chamfered corner 22c relatively reduces the length La of the major cutting edge 22a. This hinders the side surface extending from the major cutting edge 22a from functioning as a restrained surface. Thus, when installed in the tool body 32 of the face milling cutter, the insert may be unstable. Hence, the length Lc of the chamfered corner 22c is desirably equal to or less than 14% or less of the inscribed circle diameter D.

In the face milling cutter with the cutting insert 10 installed therein, the corner R edge 22d and the chamfered corner 22c offer high chipping resistance, enabling the lives of the insert and the face milling cutter to be extended. The cutting insert 10 is installed in the tool body so that the first minor cutting edge 22b is substantially at right angle to the central axis O of the face milling cutter and that the cutting insert has the positive axial rake angle AR and the negative radial rake angle RR. This enables a reduction in cutting resistance. In particular, a thrust force can be reduced which acts in a direction in which the workpiece is pressed. This is advantageous for improving the chipping resistance of the corner R edge 22d.

In general, the face milling cutter with the cutting edges described above may be subjected to a heavy load and damaged early when the corner R edges 22d located closer to the leading end of the face milling cutter and forward in the tool rotating direction D cut into the workpiece. In contrast, in the face milling cutter according to the present embodiment, the corner R edge 22d offers high chipping resistance to enable the life of the face milling cutter to be extended.

An example of test results will be described which have been obtained using a cutting insert (hereinafter referred to as an invention) corresponding to an implementation of the cutting insert according to the above-described embodiment of the present invention. The invention was designed like the insert 10 according to the above-described embodiment. Specifically, the inscribed circle diameter D was set to 12.7 mm. The angle of chamfer of the chamfered edge 12b was set to 45°, and the relief angle of the major relief face 20a was set to 20°. The relief angle of the first minor relief face 20b was set to 30°, and the relief angle of the chamfered corner relief face 20c was set to 23°. The length Lb of the first minor cutting edge 22b was set to 1.6 mm. The angle between the first minor cutting edge 22b and the chamfered corner 22c was set to 150°. The length Lc of the chamfered corner 22c was set within a range from 0.4 mm or more to 1.77 mm or less.

A cutting insert prepared for comparison (hereinafter referred to as a comparison article) was different from the invention in shape of the corner R relief face. In the comparison article, the boundary line between the corner R relief face and the first minor relief face crosses the boundary line between the corner R relief face and the chamfered corner relief face before reaching the lower surface. Thus, the corner R relief face enclosed by the two boundary lines is shaped like an inverted triangle and fails to extend to the lower surface. Furthermore, in the comparison article, the relief angle was almost constant at the cross sections of the corner R edge along the normal direction.

Figure 11:
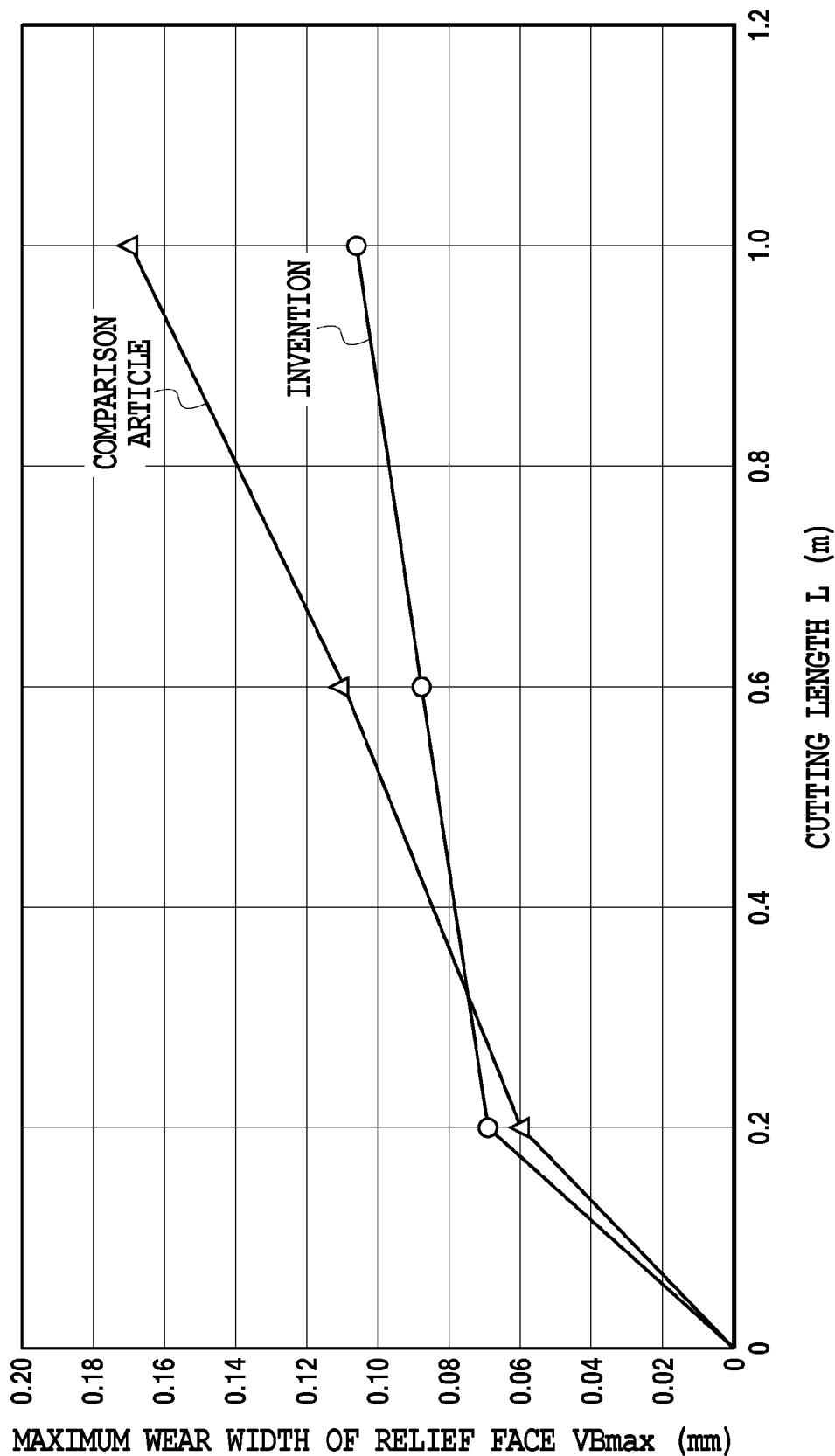
FIG. 11 is a graph illustrating the relationship between the cutting length and maximum wear width of relief face of an invention obtained by embodying the cutting insert in FIG. 1.

FIG. 11 is a graph illustrating the relationship between a cutting length L in a feeding direction and the maximum wear width of relief face VB of the corner R relief face. Cutting conditions were a cutting speed Vc of 186 m/min, a depth of cut of 0.1 mm, and a feed per tooth fz of 0.135 mm/t. Alloy tool steel SKD11 (JIS•G4404-2006) was used as a workpiece.

In the comparison article, VBmax increased rapidly after the cutting length exceeded 0.6 m. In the comparison article, VBmax reached about 0.17 mm at a cutting length of 1 m. In the comparison article, at a cutting length of 0.2 m, very small chipping occurred near the boundary between the corner R edge and the first minor cutting edge. The chipping is expected to have caused the subsequent rapid increase in VBmax.

In contrast, in the invention, no chipping occurred but only slight wear was observed near the boundary between the corner R edge and the first minor cutting edge. Thus, VBmax increased slowly and was very small, that is, about 0.11 mm, at a cutting length of 1 m. However, when the depth of cut ap was set to 0.1 mm, the upper point of the depth of cut reached within the range of the corner R edge.

Thus, the maximum wear width of relief face VBmax of the corner R relief face in the invention was clearly smaller than that in the comparison article. This is due to the improved chipping resistance of the corner R edge of the invention.

In the above-described embodiments, modifications thereof, and the like the invention has been described with some specifics. However, the present invention is not limited to the embodiments, modifications, and the like. It should be appreciated that various alterations and changes may be made to the present invention without departing from the spirits and scope of the invention set forth in the claims. That is, the present invention includes any modifications, applications, and equivalents embraced by the concepts of the present invention specified by the claims.

What is claimed is:

1. A cutting insert for removable installation in a tool body, the cutting insert comprising:
a first surface with a rake face formed thereon;
a second surface located opposite the first surface;
a peripheral side surface extending between the first surface and the second surface and comprising a relief face formed thereon and having a positive relief angle; and
a cutting edge formed at an intersection of the rake face and the relief face,
wherein the relief face is formed in association with a given corner of the cutting insert and comprises a major relief face, a first minor relief face, and an intermediate relief face extending between the major relief face and the first minor relief face,
the cutting edge comprises a major cutting edge formed at an intersection of the major relief face and the rake face, a first minor cutting edge formed at an intersection of the first minor relief face and the rake face, and an intermediate cutting edge formed at an intersection of the intermediate relief face and the rake face and linked to the major cutting edge and the first minor cutting edge, and
the intermediate relief face includes a protruding curved relief face extending from the first surface to the second surface,
the intersection of the curved relief face and the rake face has a predetermined radius of curvature which is substantially the same as a radius of curvature at the intersection of the curved relief face and the second surface, and
the intermediate relief face comprises a chamfered corner relief face extending between the curved relief face and the major relief face, and an intersection of the curved relief face and the first surface is linked to an intersection of the first minor relief face and the first surface and to an intersection of the chamfered corner relief face and the first surface.

2. The cutting insert according to claim 1, wherein:
a portion of the curved relief face which is parallel to the intersection of the curved relief face and the rake face has a shape substantially identical to a shape of the intersection of the curved relief face and the rake face.

3. The cutting insert according to claim 1, wherein:
in connection with cross sections, along a normal direction, of an arcuate cutting edge formed at the intersection of the curved relief face and the rake face, the relief angle of the curved relief face is largest at a bisecting cross section that divides the arcuate cutting edge into two equal parts and decreases gradually consistently with distance to each of opposite ends of the arcuate cutting edge in a direction from the bisecting cross section.

4. The cutting insert according to claim 1, wherein:
when a bisecting plane is defined as a plane formed to divide each of the first minor cutting edge and the first minor relief face into two equal parts, the curved relief face extends so that a distance between the curved relief face and the bisecting plane varies in a direction from the first surface toward the second surface.

5. The cutting insert according to claim 1, wherein:
the predetermined radius of curvature is within a range from 0.4 mm or more to 2.5 mm or less.

6. The cutting insert according to claim 1, wherein:
the intersection of the curved relief face and the first surface is smoothly linked, in a tangential direction, to the intersection of the first minor relief face and the first surface and to the intersection of the chamfered corner relief face and the first surface.

7. The cutting insert according to claim 6, wherein:
an extension line along the intersection of the first minor relief face and the first surface forms an angle within a range from 145° or more to 170° or less to an extension line along the intersection of the chamfered corner relief face and the first surface.

8. The cutting insert according to claim 6, wherein:
a length of the intersection of the chamfered corner relief face and the first surface is within a range from 0.4 mm or more to 14% or less of an inscribed circle diameter of the first surface.

9. The cutting insert according to claim 1, wherein:
the first surface is substantially polygonal,
the cutting edge extends continuously all over the intersection of the first surface and the peripheral side surface, and is indexable, and
the relief face extends all over the peripheral side surface.

10. A face milling cutter including the cutting insert according to claim 1, and a tool body with the cutting insert removably installed therein and rotated around a central axis, wherein:
the cutting insert is installed in the tool body in such a manner that the first minor cutting edge extends so as to be substantially perpendicular to the central axis and that the cutting insert has a positive axial rake angle and a negative radial rake angle.

11. The cutting insert according to claim 1, wherein a relief angle of the first minor relief face is greater than that of the major relief face.

* * * * *